March 15, 1966 — J. A. MAS — 3,241,028
TEMPERATURE COMPENSATED REGULATOR FOR BATTERY CHARGING
Filed July 20, 1962
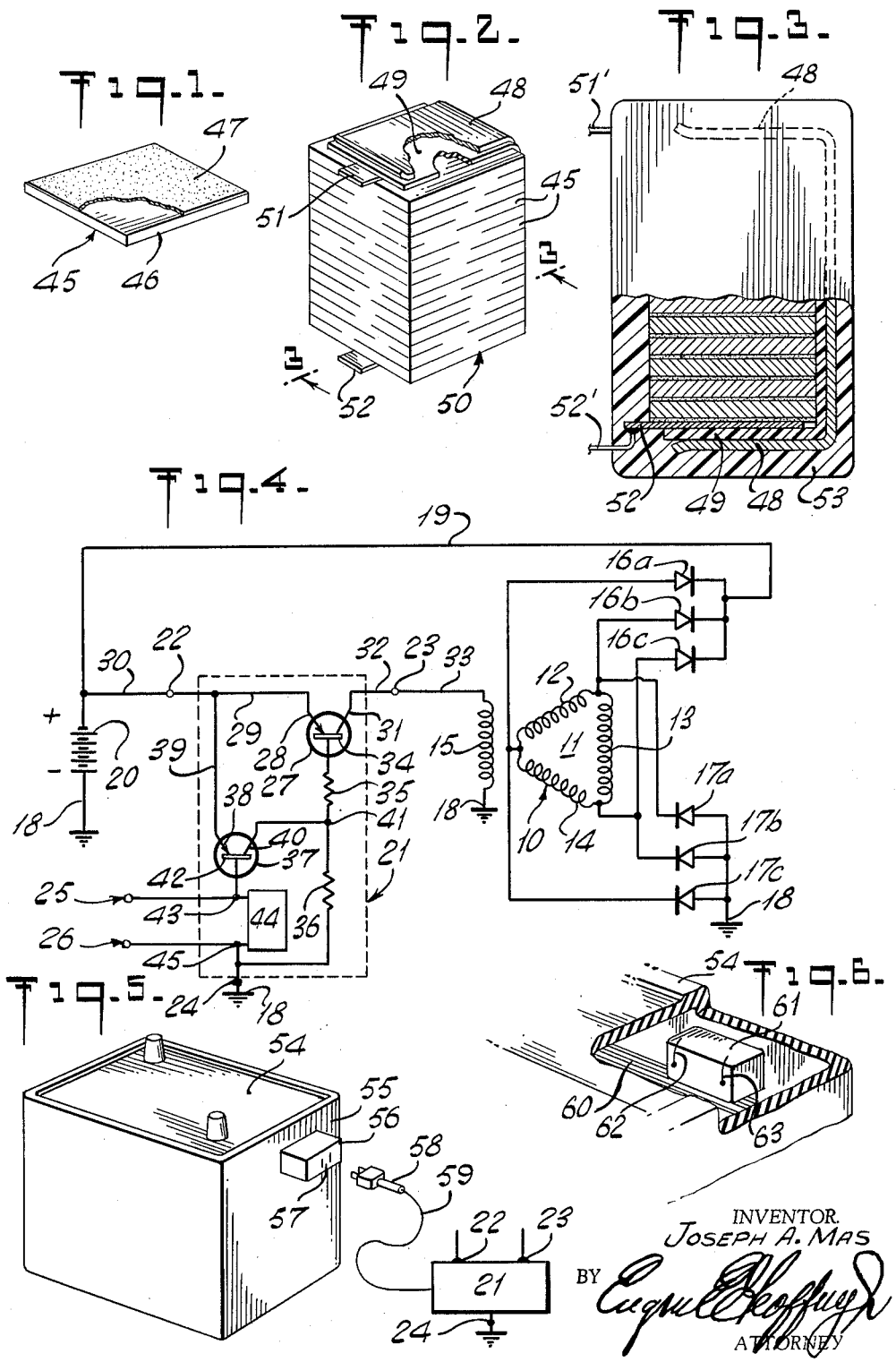
INVENTOR.
JOSEPH A. MAS
BY Eugene E. Geoffroy
ATTORNEY

United States Patent Office 3,241,028
Patented Mar. 15, 1966

3,241,028
TEMPERATURE COMPENSATED REGULATOR
FOR BATTERY CHARGING
Joseph A. Mas, Woodbury, N.Y., assignor to Dynamic Instrument Corp., a corporation of New York
Filed July 20, 1962, Ser. No. 211,959
5 Claims. (Cl. 320—39)

This invention relates to voltage regulating systems and, more specifically, to a novel and improved voltage regulator and method of operation useful, among other things, for regulating the charging rate of automotive batteries. The invention further contemplates an improved temperature compensation system to modify the charge rate of batteries in accordance with the ambient temperature.

With the development of relatively low cost solid state rectifiers, alternators are frequently used in place of conventional direct current generators as the power source for operation of the vehicle and charging of vehicle's battery. The alternator generally comprises a 3-phase stator and a single-phase armature, which carries the field. By controlling the current through the field, the voltage induced into the stator can be adjusted to any desired level within the rating of the alternator. The output of the stator is rectified to produce direct current for operation of the ignition, energizing the lighting system, and recharging the battery.

Control of the current in the field of the alternator has presented considerable difficulties, particularly in connection with the regulation of the field current in accordance with the ambient temperature. It has been found, for instance, that when the ambient temperature is low, it is necessary to apply a relatively high rate of charge to the battery in order to raise it to a predetermined level of charge, while at high ambient temperatures, the rate of charge must be materially reduced to prevent charging the battery beyond a safe level and, thus, damage the cells.

A further problem entailed with voltage regulating systems, and particularly those utilized with automotive equipment, resides in the fact that automotive engine speeds will vary throughout a range starting as low as 400 r.p.m. and exceeding speeds of as high as 5,000 r.p.m. It is desirable to maintain a battery charging rate relatively uniform throughout the entire speed range of the engine and, at the same time, prevent overcharging and consequent damage to the battery.

This invention has as one of its objects the provision of an improved voltage regulating system, particularly useful for automotive equipment utilizing alternators, that is, characterized by its relatively low cost, excellent control of the charging rate throughout a wide range of alternator speeds and ambient temperatures, simplicity and dependability.

Another object of the invention resides in the provision of a novel and improved voltage regulating circuit, including means for automatically modifying the regulated voltage in accordance with ambient temperature.

Still another object of the invention resides in the provision of a novel and improved temperature responsive means particularly useful in modifying the flow of current in a circuit in accordance with changes in ambient temperature.

Still another object of the invention resides in the provision of a novel and improved storage battery particularly useful for automotive vehicles, which includes temperature responsive means that may be interconnected with a charging circuit for controlling the charge rate in accordance with the battery temperature.

Still another object of the invention resides in a novel and improved battery charging system.

The above and other objects of the invention will become more apparent from the following description and accompanying drawings forming part of this application.

In the drawings, FIG. 1 has a perspective view of a temperature controlling element in accordance with the invention.

FIG. 2 has a perspective view of a stack of temperature control elements of the type shown in FIG. 1.

FIG. 3 has a cross-sectional view of the structure shown in FIG. 2 enclosed within an outer protective housing.

FIG. 4 has a circuit diagram of a voltage regulating system in accordance with the invention and utilizing the control element shown in FIG. 3.

FIG. 5 has a perspective view of a battery case with a storage battery positioned therein and having temperature responsive means carried by the battery housing.

FIG. 6 has a fragmentary perspective view of a storage battery with a portion cut away to show temperature responsive means incorporated within the battery.

The voltage control, in accordance with the invention, is illustrated diagramatically in FIG. 4 and is utilized for controlling the output voltage of a 3-phase alternator. The alternator is generally denoted by the numeral 10 and comprises a 3-phase Delta-connected stator 11, having 3 windings, 12, 13, and 14. A field winding 15 is carried by the armature and the magnetic field generated by this winding during rotation of the armature causes 3-phase alternating current to be generated in the stator 11. The operation of the alternators is well-known and a more detailed description is not deemed necessary.

The output of the 3-phase stator is rectified by solid state rectifiers 16a, 16b, 16c, 17a, 17b, and 17c. The rectifiers 17a through c form the negative terminal and are connected to a suitable ground 18. The rectifiers 16a through c are connected together and form the positive output terminal. While solid state rectifiers are preferred, it is evident, however, that any suitable rectifier may be utilized for the same purpose. Furthermore, it is possible to use other types of voltage generating means, wherein the output voltage is controlled by the magnitude of a current applied to a control winding. It is also evident that while the Delta-connected 3-phase stator is utilized, single-phase or other multiple-phase units may be employed, which are either Delta or Y-connected.

In automotive applications, the positive output terminal of the alternator 10 is usually connected by means of a lead 19 to the positive side of a battery 20, the negative terminal of the battery being returned to the ground 18. The charging rate of the alternator is controlled by regulating the current flowing through the field winding 15, and this is effected by the circuitry included within the box 21. The circuitry included within the box 21 may be formed as a separate unit having three terminals, 22, 23 and 24, and in an alternate embodiment of the invention, additional terminals 25 and 26 may be utilized for purposes to be described.

The basic regulating element forming part of the circuit within box 21 is a transistor 27. The emitter 28 of this transistor is connected through a lead 29 to the input terminal 22, which terminal is connected via the lead 30 to the positive side of the battery 20. The collector 31, or the transistor 27, is connected via the lead 32 to the output terminal 23, the latter being connected externally via the lead 33 to one side of the field 15. The other side of the field 15 is connected to the ground 18. With this arrangement, the current through the field 15 is supplied by the battery 20 and is controlled by the transistor 27. Therefore, the transistor must have a large enough rating to handle the maximum field current required for the highest charging rate. In the normal case for vehicles utilizing 12-volt batteries and appropriate alternators, this field current is generally of the order of magnitude of about 2 amperes.

The current through the transistor 27 is controlled by the current in the base 34, and this is accomplished by connection of the base 34 through resistors 35 and 36 to the terminal 24 and via this terminal to the ground 18. With the circuit thus far described, it is evident that battery voltage is applied between the base 34 and the emitter 28 and with the resistors 35 and 36 properly adjusted, a current will be produced through the field 15 sufficient to saturate it and produce a maximum output current limited solely by the electrical characteristics of the field. The values of the resistors 35 and 36 are selected in accordance with the characteristics of the transistor 27 and the control transistor 37 to be described. For example, in a 12-volt system, when the transistor 27 is a 2N677 and the transistor 37 is a 2N234, then the resistor 35 may have a value of about 100 ohms. The transistor 37 has an emitter 38 connected by a lead 39 to the lead 29. The collector 50 is connected to the junction 51 between the resistors 35 and 36. The base 52 of the transistor is connected to one side 43 of a control device 44, the other side 45 of the control device 44 being connected to the treminal 24 and thence to the ground 18. If the control device 44 is located outside of the confines of the regulator 21 the regulator is provided with the terminals 25 and 26 for connection of the external regulator 44.

With the foregoing circuit and assuming a relatively low battery voltage, a charging current through the lead 19 will be a maximum. Assuming that the regulating element 44 is a fixed resistance, then as the battery voltage on the lead 30 increases, the transistor 37 will start to conduct so that current will flow from the emitter 38 to the collector 40. This current will increase until a predetermined maximum voltage is attained on the lead 30, in which case the effective shunt produced between the lead 29 and the terminal 41 has reduced the bias on transistor 27 to a point where the transistor 27 no longer conducts. This will interrupt the charging current until such time as the battery voltage falls below a predetermined value.

Inasmuch as a transistor such as the transistor 37 is essentially a linear device, the regulator element 44 is arranged to cooperate with the transistor in such a manner that the transistor 37 is caused to function in the nature of a switch so that when the voltage applied between the ground 18 and the lead 29 exceeds a predetermined value the transistor 37 will conduct heavily and interrupt the charging current. This effect may be accomplished by any suitable device wherein the resistance varies sharply with a critical change in current, as for instance a rectifier which has substantially infinite impedance at a low current and substantially "0" impedance when the current reaches a predetermined value. Thus in the circuit described above and with the regulating element being in the form of a rectifier when the voltage across the regulating element 44 reaches a predetermined value as a result of the increase in voltage on the lead 29 the regulating element immediately conducts and causes the transistor 37 to conduct heavily and thereby interrupt conduction of the transistor 27 and de-energize the field 15.

While the circuit thus far described is generally useful for charging all types of batteries, it is particularly useful for charging automotive batteries. Automotive batteries generally in use today are of the lead-acid type and the charging rate of the battery to attain 80% of the total possible charge varies materially with the temperature of the battery. For instance, a 12-volt battery at "0" degree F. should have a voltage of approximately 15.5 volts applied in order to attain an 80% charge. The same battery should have a voltage not exceeding 13.5 volts applied when the temperature of the battery is at 100 degrees F.

It has been found that the charging rate can be controlled by the utilization of a novel and improved regulating element 44 formed of a plurality of selenium rectifier disks stacked one upon the other. By stacking the appropriate number of selenium disks the critical voltage at which conduction is initiated can be selected to obtain the desired mode of operation of the regulator 21.

The utilization of a selenium stack affords a number of advantages, one of the most significant being its temperature-voltage characteristic. It has been found that the voltage at which the rectifier will initiate conduction increases as the temperature decreases, thus affording a negative characteristic. Furthermore, the utilization of a negative characteristic rectifier with the improved circuitry described above affords a simplified, dependable, stable and relatively low cost voltage regulator which presents a material advance over known devices intended for similar applications.

A single selenium disk or plate is shown in FIG. 1 and denoted generally by the numeral 45. The peripheral configuration of the disk is not critical and for illustrative purposes has been shown in a rectangular configuration. It comprises essentially a rectangular plate 46 of aluminum or other suitable material and an overlying layer 47 of selenium. A selected number of these disks or elements 45 are stacked one upon the other and are held tightly by a spring clamp 58 which is of U-shaped configuration and is lined with a layer of insulating material 49 to prevent short-circuiting of the plates 45. The stack generally denoted by the numeral 50 is provided with upper and lower terminals 51 and 52 with one terminal making contact with a selenium layer of one end element and the other terminal contacting the aluminum plate 46 of the other end element. Leads 51' and 52' are attached to the terminals 51 and 52 and the entire stack is then preferably encased in a protective housing 53 of plastic or other suitable material.

The number of elements 45 in a stack 50 is governed by the voltage of the battery 20 and the desired charging rate. At room temperature, which is approximately 20 degrees C., an appropriate final charge voltage for a 12-volt lead-acid battery is approximately 14.5 volts. Assuming .6 of a volt per element is the voltage at which the element will conduct, approximately 24 elements would be required in a single stack to provide a maximum charging rate of 14.5 volts at 20 degrees C. In actual practice it will be found that the selenium stack operates in the nature of a switch so that only a small voltage change is required to effect substantially complete conduction after the voltage has reached a minimum value that initiates conduction through the element.

The temperature characteristic of a selenium stack is roughly .025 volt per degree C. Let it be assumed that the desired charging rate for the 12-volt battery at "0" degrees C. is 15 volts. Under these conditions the charging rate at 10 degrees C. will automatically decrease to 14.75 volts. At 20 degrees C., it will be approximately 14.5 volts. At 50 degrees C. which is roughly 120 degrees F., the charging rate will be 13.5 volts which is approximately the recommended charging rate at that high temperature. From the foregoing it will be observed that with the use of a selenium stack as the regulating element 44, the charging rate of the battery is automatically modified in accordance with changes in temperature to decrease the charging rate as the temperature increases. Furthermore, the utilization of a transistor regulator overcomes the problems entailed with conventional devices using switching contacts and the regulator will not be affected by vibration or other physical conditions which adversely affect mechanical devices. Furthermore, in connection with automotive applications, variations in speed of the engine and therefore the generator 10 will not modify the charging rate as determined by the characteristics of the regulator.

In many instances the battery 20 of the automotive vehicle may be located some distance from the engine and with this novel and improved regulator it is possible to control the charging rate in accordance with the actual temperature of the battery rather than the temperature of the regulating unit 21. FIG. 5 illustrates a conventional 12 volt storage battery generally denoted by the numeral 54. The battery is contained within an outer housing 55 of metal or other suitable material for supporting and retaining the battery 54. The battery case 55 includes a housing 56 fixedly secured thereto and containing a control element such as the selenium stack shown in FIGS. 2 and 3. The leads 51' and 52' are connected to a female receptacle 57 on the housing 56 and a plug 58 and cable 59 connect the selenium stack to the regulator 21 which would correspond to the terminals 25 and 26 of FIG. 4. In this case of course the regulating element 44 as shown in FIG. 4 would be omitted from the regulator 21.

If desired, the selenium stack as shown in FIG. 3 and having an outer housing 53 of an acid resistant material could be included within one of the lead-acid cells forming part of the battery 54. This form of the invention is illustrated in FIG. 6. It will be observed that a corner of the battery has been broken away to expose the battery plates 60 and show the regulating element 61 which includes a selenium stack such as illustrated in FIG. 3. The leads 62 and 63 are brought out through the battery wall to an appropriate connector to accommodate a suitable plug such as the plug 58 of FIG. 5 for connection of the regulating element to the regulator 21. In this way the regulator responds to the actual internal temperature of the battery 54 with the result that the charging current applied to the battery will be automatically controlled in accordance with the actual temperature of the battery and thereby provide the maximum recommended charging rate. At the same time excessive charging rates are prevented which materially reduce the normal life of the battery.

While only certain embodiments of the invention have been illustrated and described, it is apparent that modifications, alterations and changes may be made without departing from the true scope and spirit thereof.

What is claimed is:

1. A voltage responsive current regulator for charging batteries comprising a control device having input, output and control terminals, a connection between said input terminal and one side of said battery, a connection between said output terminal and a load circuit, a return circuit including a series impedance between said control terminal and the other side of said battery to cause said device to maintain current flow from said battery to said load, a second control device having input, output and control terminals, connections between the last said input and output terminals and the first said input terminal and return circuit respectively and a return circuit including a rectifier having a negative temperature coefficient and connecting the last said control terminal to the other side of said battery, said rectifier being effectively subjected to the full voltage of said battery and becoming conductive upon a predetermined voltage rise in said battery thereupon applying substantially the entire battery voltage between the input and control terminals of said second device and interrupting the flow of current in said load, said predetermined voltage rise decreasing with an increase in temperature.

2. A voltage responsive current regulator for charging batteries comprising a control device having input, output and control terminals, a connection between said input terminal and one side of said battery, a connection between said output terminal and a load circuit, a return circuit including a series impedance between said control terminal and the other side of said battery to cause said device to maintain current flow from said battery to said load, a second control device having input, output and control terminals, connections between the last said input and output terminals and the first said input terminal and return circuit respectively and a return circuit including a rectifier formed of a plurality of rectifier elements stacked one upon the other with each element having a metallic base plate and a coating of selenium on one side thereof, said rectifier having a negative temperature coefficient and connecting the last said control terminal to the other side of said battery, said rectifier being effectively subjected to the full voltage of said battery and becoming conductive upon a predetermined voltage rise in said battery thereupon applying substantially the entire battery voltage between the input and control terminals of said second device and interrupting the flow of current in said load, said predetermined voltage rise decreasing with an increase in temperature.

3. In a voltage supply having a chargeable battery and a motor driven D.C. generator connected to said battery, said generator including a field coil which when energized causes said generator to produce electrical energy for charging said battery, means for regulating the charge applied to said battery comprising a control device having input, output and control terminals, a connection between said input terminal and one side of said battery, a connection between said output terminal and one side of said field coil, the other side of said field coil being returned to the other side of said battery, a return circuit including a tapped series impedance between said control terminal and the other side of said battery to cause said device to maintain current flow from said battery to said field coil, a second control device having input and output terminals connected between the first said input terminal and the tap on said impedance respectively and a return circuit including a negative temperature coefficient rectifier connecting the last said control terminal to the other side of said battery, said rectifier being effectively subjected to the full voltage of said battery and becoming conductive upon a predetermined rise in the battery voltage as a result of the operation of said generator to apply substantially the entire increased battery voltage between the input and control terminals of said second device and thereby interrupt the flow of current in the field coil, said predetermined voltage rise decreasing with an increase in temperature.

4. In a voltage supply according to claim 3 wherein said control devices are transistors.

5. In a voltage supply having a chargeable battery and a motor driven D.C. generator connected to said battery, said generator including a field coil which when energized causes said generator to produce electrical energy for charging said battery, means for regulating the charge applied to said battery comprising a control device having input, output and control terminals, a connection between said input terminal and one side of said battery, a connection between said output terminal and one side of said field coil, the other side of said field coil being returned to the other side of said battery, a return circuit including a tapped series impedance between said control terminal and the other side of said battery to cause said device to maintain current flow from said battery to said field coil, a second control device having input and output terminals connected between the first said input terminal and the tap on said impedance respectively and a return circuit including a negative temperature coefficient rectifier connecting the last said control terminal to the other side of said battery, said rectifier being effectively subjected to the full voltage of said battery and becoming conductive upon a predetermined rise in the battery voltage as a result of the operation of said generator to apply substantially the entire increased battery voltage between the input and control terminals of said second device and thereby interrupt the flow of current in the field coil, said predetermined voltage rise decreasing with an increase in temperature, and said rectifier being positioned in and responsive to the temperature of said battery.

References Cited by the Examiner

UNITED STATES PATENTS

| | | | |
|---|---|---|---|
| 2,203,328 | 6/1940 | Geisler | 317—241 |
| 2,421,523 | 6/1947 | Rady | 320—35 |
| 2,422,925 | 6/1947 | Rady et al. | 320—35 |
| 2,555,247 | 5/1951 | Saslaw | 317—241 |
| 3,022,457 | 2/1962 | Doan | 323—68 |
| 3,041,525 | 6/1962 | Shimwell et al. | 322—73 |
| 3,121,837 | 2/1964 | Holm et al. | 322—73 |

OTHER REFERENCES

Hartz: Selenium Rectifier Cells, Electrical Engineering, October 1943, pages 624 and 625.

LLOYD McCOLLUM, *Primary Examiner*.